Aug. 17, 1954     T. F. ESERKALN     2,686,459
UNIVERSAL MILLING MACHINE
Filed Dec. 12, 1949     5 Sheets-Sheet 1
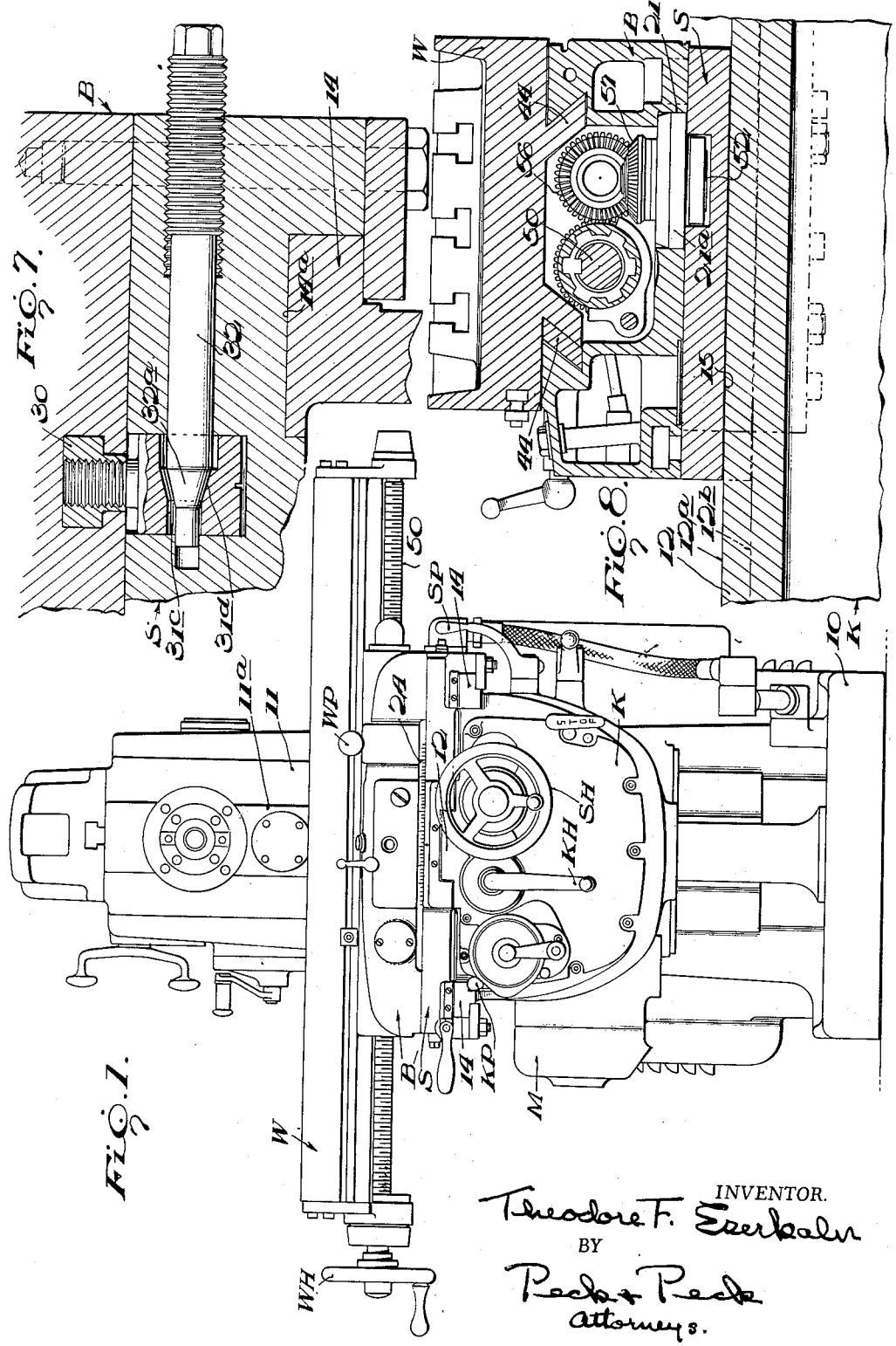
INVENTOR.
Theodore F. Eserkaln
BY
Rector & Rector
Attorneys.

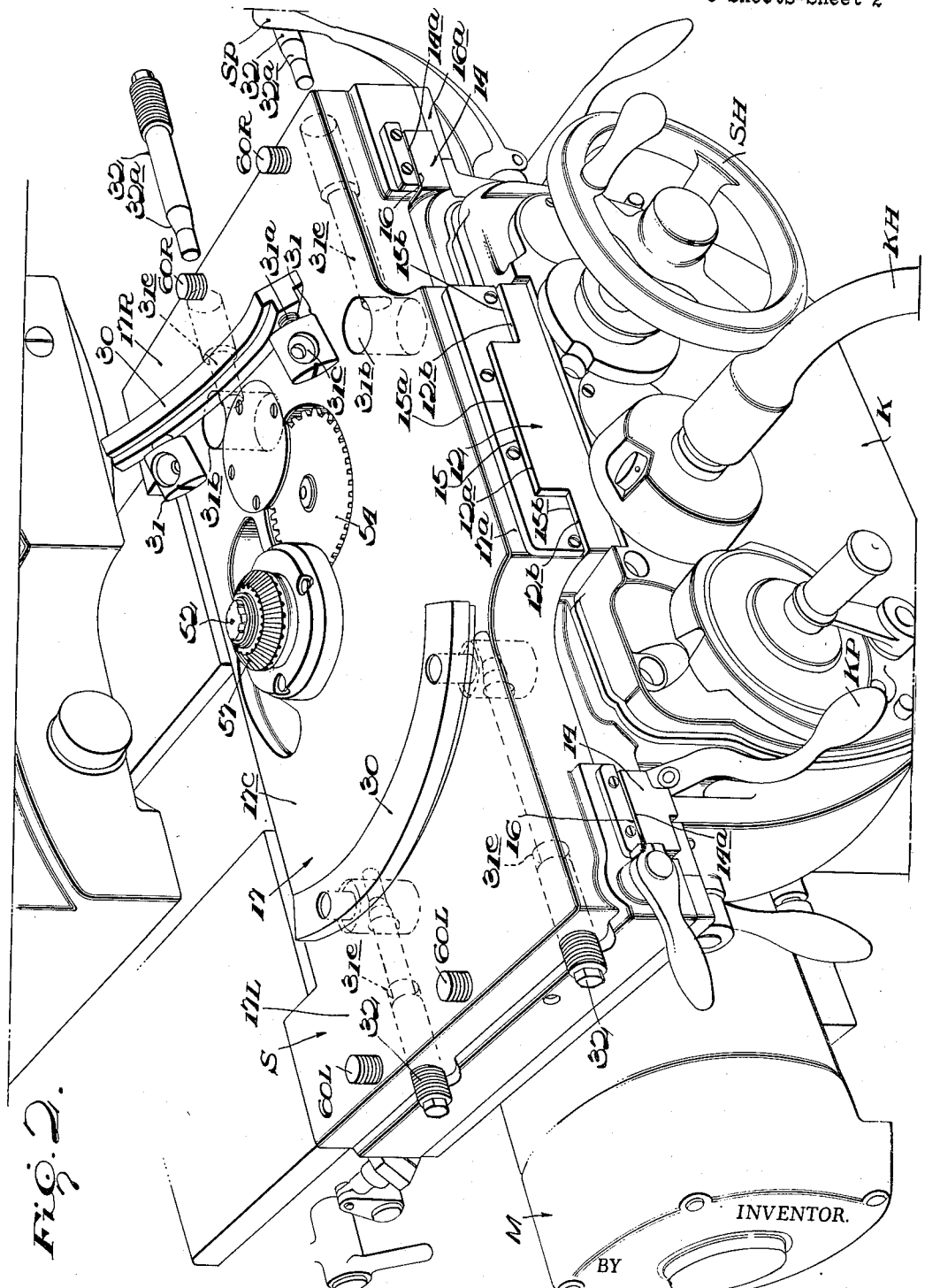

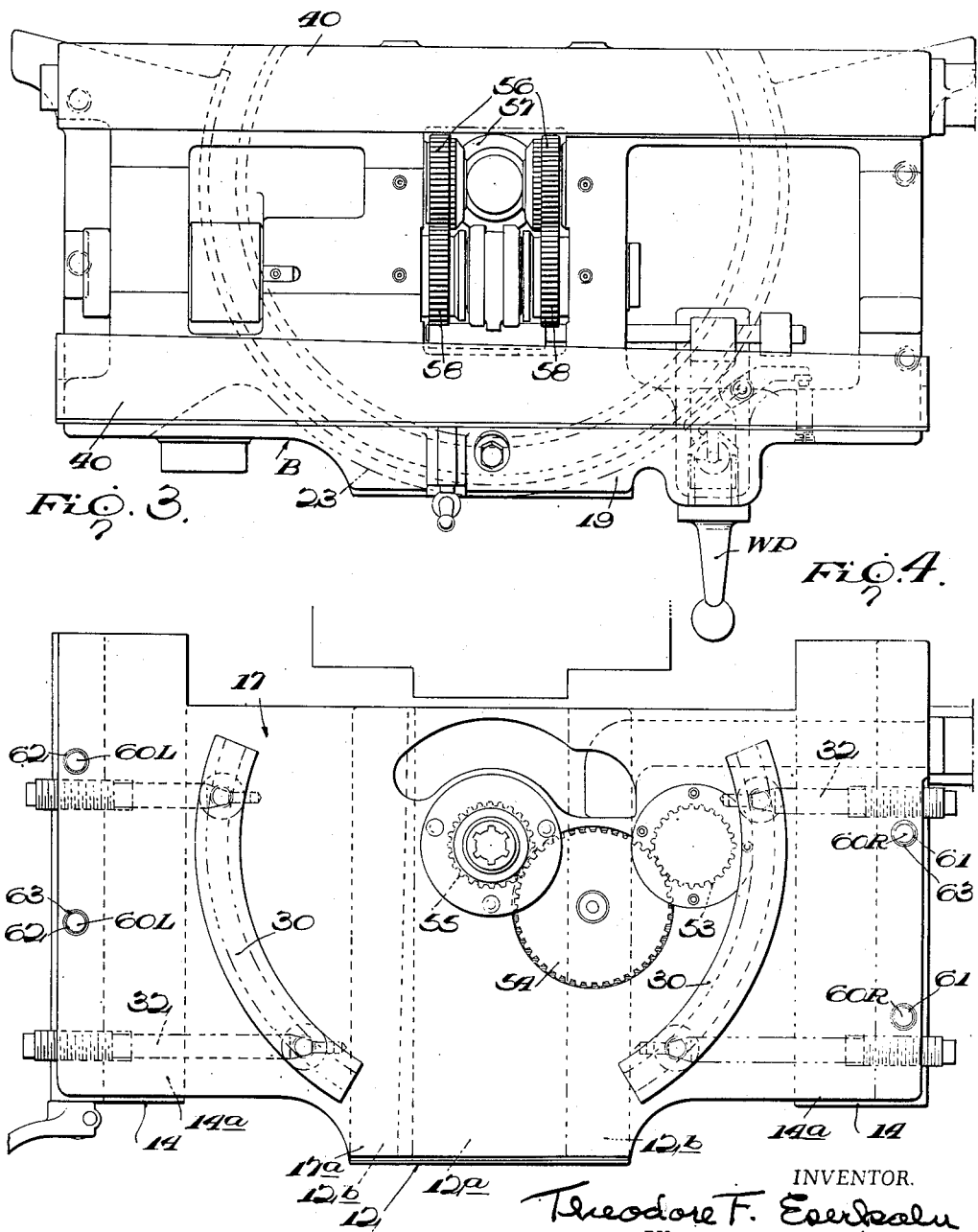

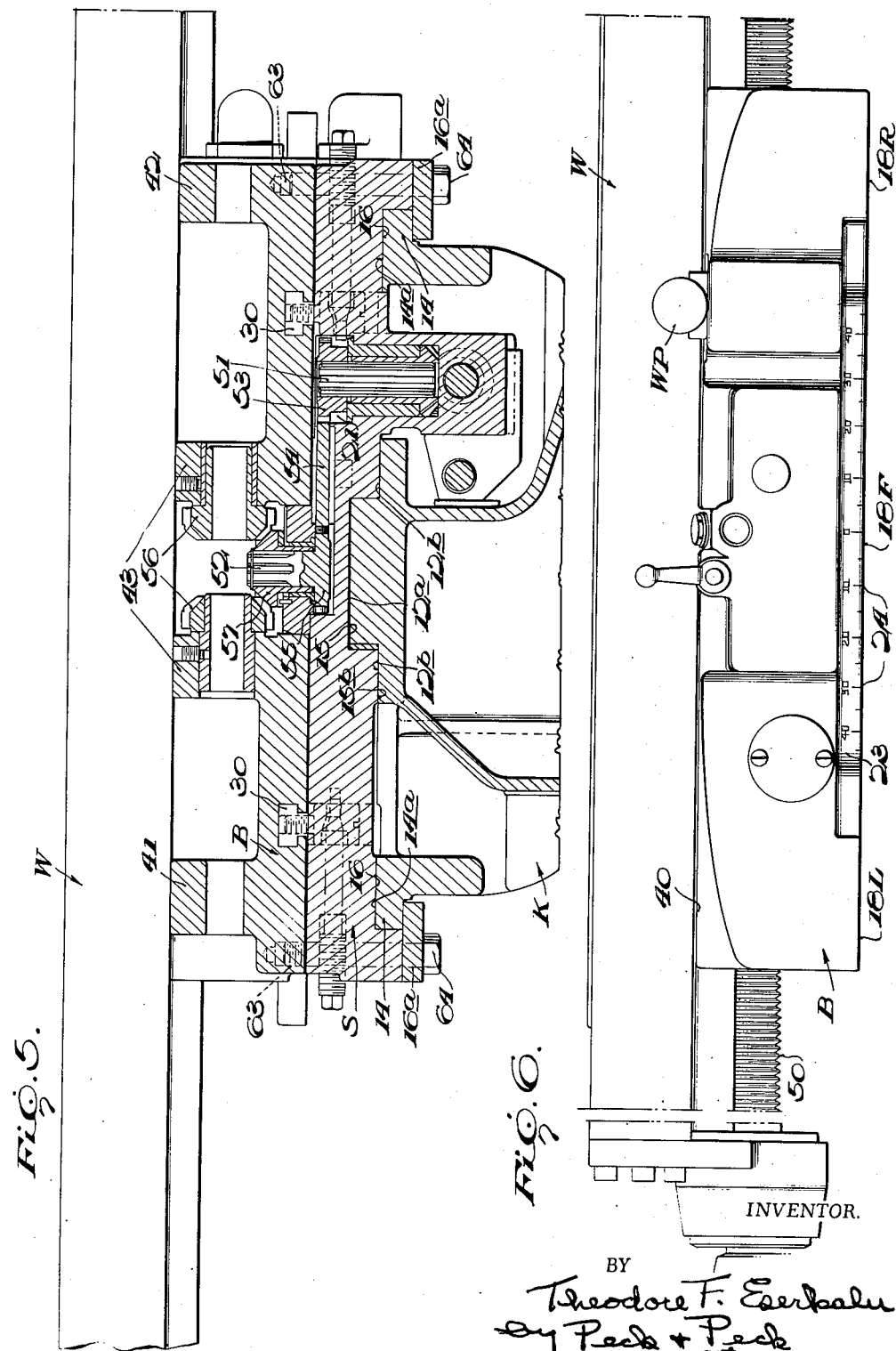

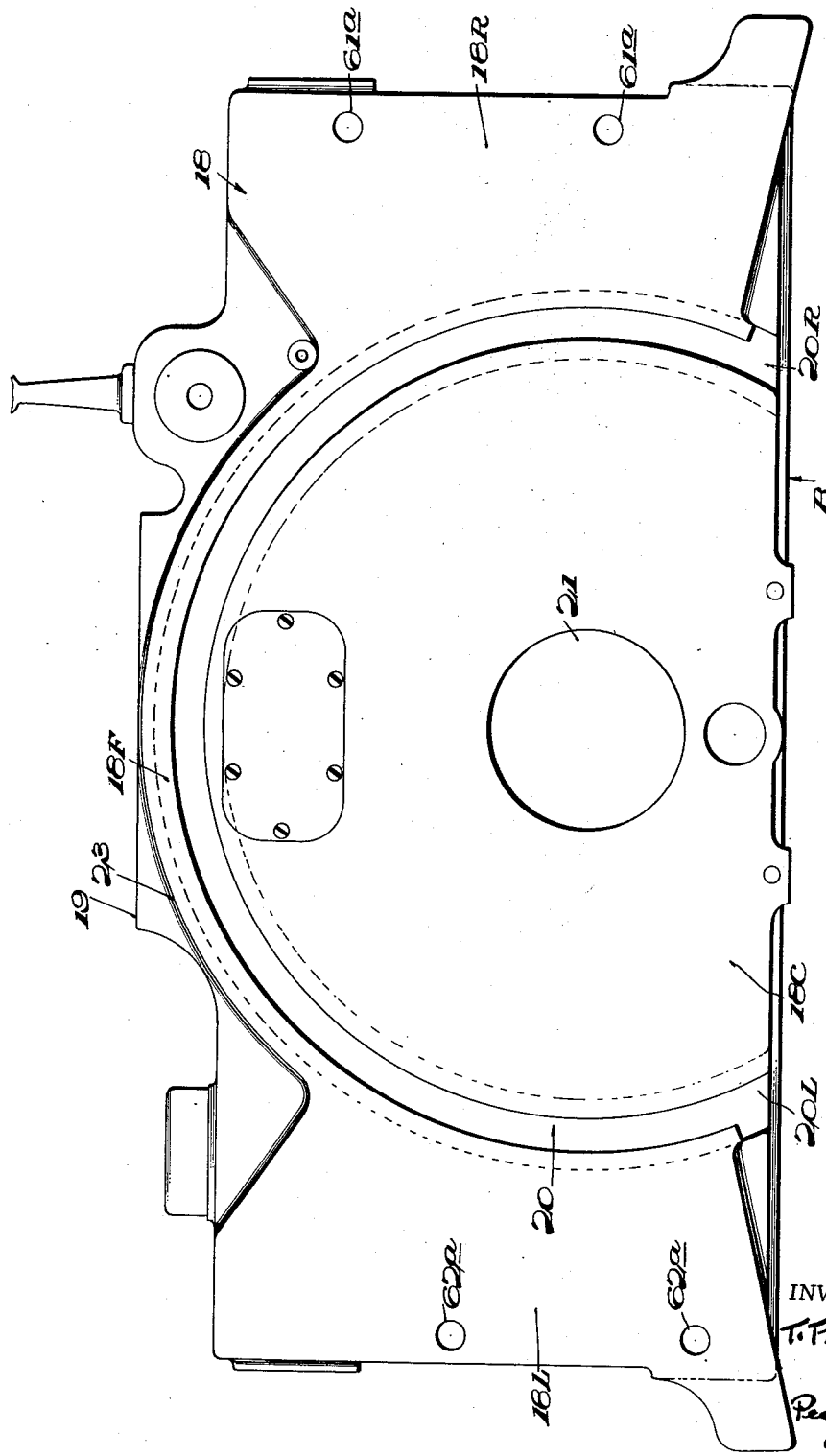

Patented Aug. 17, 1954

2,686,459

UNITED STATES PATENT OFFICE 2,686,459

UNIVERSAL MILLING MACHINE

Theodore F. Eserkaln, Wauwatosa, Wis., assignor to George Gorton Machine Co., Racine, Wis., a corporation of Wisconsin Application December 12, 1949, Serial No. 132,527

1 Claim. (Cl. 90—58)

This invention relates to milling machines of the so-called universal types; and the nature and objects of the invention will be readily recognized and understood by those skilled in the art in the light of the following explanation and detailed description of the accompanying drawings illustrating what I now consider to be the preferred embodiment or mechanical expression of my invention from among various other forms, expressions, embodiments, arrangements, modifications, designs, constructions and combinations of which the invention is capable within the broad spirit and scope thereof, as defined by the hereinafter appended claim.

So-called "universal" milling machines of the vertical column and knee type are characterized generally by a vertically disposed column structure at the forward side of which there is mounted a knee structure for vertical translation on suitable ways. The knee structure mounts at its upper side a saddle or slide member for translation transversely relative to the machine, that is, "in" and "out," on ways provided on the upper side of the knee structure. The saddle mounts on its upper side a swivel block which is mounted for rotation about a vertical axis and which is carried by the saddle structure for "in" and "out" translation as a unit with that structure. The swivel block supports at its upper side a work table which is mounted on suitable ways on the swivel block for translation generally longitudinally or to the right and left across the swivel block relative to the machine. Thus, the swivel block is rotatable on the saddle to angularly adjust the work table relative to the machine and to the path of translation "in" and "out" of the saddle on the knee structure. A clamping arrangement is provided for releasably securing the swivel block in what may be termed its normal position to position the work table for translation along a path perpendicular to the path of transverse translation of the saddle, swivel block and table as a unit, as well as for releasably securing the swivel block and the work table in any angularly adjusted position thereof within the range of adjustment provided therefor.

With such universal milling machines, particularly when of the power driven types requiring work tables of relatively large dimensions and area for handling large work pieces for heavy duty milling operations, it is essential in order to attain in the milling operations carried out by the machine the high degree of precision desired, that the assembly of knee, saddle, swivel block and work table provide maximum stability and rigidity for the table to reduce to a minimum the possibility of deflection of the table under the various conditions encountered in the production operation of the machine. The attainment of the desired high degree of rigidity and stability for the work tables of universal type milling machines, has been found to be difficult due to the lateral dimensions and space limitations imposed on the knee, saddle and swivel block by the design requirements for such machines, as well as by the design and engineering precedent established over many years, with the result that the supporting and bearing surfaces provided by the knee for the saddle and by the saddle for the swivel block have been of limited area and limited spacing both laterally in the direction of longitudinal translation and transversely in the direction of "in" and "out" translation, of the work table. These conditions have resulted in a reduction in the potential efficiency and precision of milling operations which can be performed on work mounted on the work tables of such universal types of milling machines.

The primary object of my present invention is to overcome or substantially reduce the error potential present in performing milling operations with the so-called universal types of milling machines, due to the possibility of work table deflections resulting from instability and lack of rigidity of the work table supporting assembly of knee, saddle and swivel block.

Another object is to provide a design, construction and arrangement of the knee, saddle and work table supporting swivel block of a universal type milling machine, in which the supporting and bearing surfaces provided by the knee for the saddle and by the saddle for the swivel block, are of maximum area and of maximum spacing radially relative to the axis of rotation of the swivel block in directions transverse and longitudinally of the machine.

A more specific object is to provide a design and construction of saddle and swivel block by which the swivel block supporting and bearing surfaces of the saddle and the engaging complementary bearing surfaces of the swivel block, are of relatively large area and extended for substantially the full width and length of the saddle and swivel block longitudinally and transversely, respectively, of the machine, with said surfaces being located completely around and surrounding the axis of rotation of the swivel block on the saddle.

And a further object of the invention is to provide such a design, construction and mounting of knee, saddle and swivel block, with clamping arrangements by which the swivel block and table may be releasably secured in any position of angular adjustment, and further by which additional clamping is provided for releasably securing the swivel block and table in normal position of adjustment, to thus attain a maximum of rigidity for the work table for operation of the machine as a plain milling machine.

With the foregoing and various other objects, features and results in view, which others will be readily apparent from the following detailed description and explanation, my invention consists in certain novel features in design and construction of parts and elements, and in combinations and arrangements thereof, all as will be more fully referred to and specified hereinafter.

Referring to the accompanying drawings in which similar reference characters refer to corresponding parts and elements throughout the several figures thereof:

Fig. 1 is a view in front elevation of a universal milling machine of the knee and column type having a knee, saddle, swivel block and work table construction, arrangement and assembly embodying my invention.

Fig. 2 is a perspective view of the knee and saddle in mounted position thereof, with the swivel block and work table removed therefrom.

Fig. 3 is a top plan view of the swivel block with the work table removed.

Fig. 4 is a top plan view of the saddle with the swivel block and work table removed.

Fig. 5 is a vertical, longitudinal section through the swivel block, saddle and upper portion of the knee structure.

Fig. 6 is a view in front elevation of the swivel block and work table in assembled relation.

Fig. 7 is a detailed, vertical sectional view through a portion of the saddle and a portion of the swivel block mounted thereon, showing one of the arcuate members for mounting the swivel block on the saddle, and one of the clamping screws of the clamping arrangement therefor.

Fig. 8 is a vertical, transverse section through the assembled work table, swivel block, saddle and a portion of the upper side of the knee structure.

Fig. 9 is a bottom plan view of the swivel block.

An embodiment of the invention is disclosed in the accompanying drawings as applied to and incorporated in a column and knee universal milling machine of the powered type for heavy duty milling operations, in which the knee, saddle and work table components are adapted to be power driven. The example milling machine happens to be of the so-called horizontal type, in which the cutter spindle is mounted in horizontal position, but it is to be understood that the invention is not limited to such types of machines, as it is equally applicable to so-called vertical types in which the cutter spindle is mounted in vertically disposed position. While in the machine of the example, the knee, saddle and table components thereof are adapted to be power driven, the invention is not limited to power driven types, but may be applied to and embodied in machines of the type in which the knee, saddle and table components are solely manually operable.

Referring to Fig. 1, the example machine includes a base 10 with a vertical column 11 extending upwardly therefrom. A knee K is mounted on the base 10 at the forward side of column 11 for vertical translation upwardly and downwardly along vertical ways 11a at the forward side of the column. In this instance the power driven feed (not shown) for raising and lowering knee K, is controlled by the hand lever KP and is driven from a motor M mounted on the knee at the left hand side thereof. The knee feed is also optionally operable manually by the medium of the hand crank KH located at the forward side of the knee.

The knee structure K is of the full width type, and in the present example has a lateral dimension at the widest upper portion thereof such that the knee has a maximum width greater than the width of column 11. The knee K is of hollow construction in the general form of a housing or casing within which are mounted and enclosed the various drives and speed change gear trains (not shown) therefor in the general manner familiar in the art for this type of milling machine knee. The upper side of knee K, referring now to Figs. 2, 4 and 8, provides a centrally located slide way 12 extending completely thereacross from front to rear thereof. Slide way 12 includes a relatively narrow, upwardly extended rib or guide portion having an upper or top side 12a, and lower bearing surfaces 12b at opposite sides of such guide portion in generally parallel relation therewith. At opposite, lateral outer sides of the knee K at the upper side thereof, horizontally disposed rail members 14 are formed. The rails 14 extend completely across knee K from front to rear thereof and are formed at their upper sides to provide the horizontal bearing surfaces 14a parallel with the bearing surfaces of the slide way 12. Thus, the knee K provides by the rails 14, the widely laterally spaced bearing surfaces 14a which extend for substantially the full transverse dimension of the knee.

A saddle S of generally rectangular plan, plate-like form is mounted on the upper side of knee K for translation transversely, or "in" and "out," relative to the machine for cross feeding on the slide bearing surfaces provided by the central slide 12 and by the laterally spaced rails 14. In this instance, the lower or under side of saddle S is provided with a central slide way receiving groove 15 extending transversely thereacross and providing surfaces complementary to the surfaces of slide way 12, including the central surface 15a having clearance with top surface 12a, and the opposite side bearing surfaces 15b, supported upon and in slidable bearing engagement with the bearing surfaces 12b, of the slide way 12.

The saddle S in this example, has a length greater than the width of knee K at the upper side thereof, so that saddle S projects at its opposite ends a distance beyond the opposite side rails 14 of the knee, as will be clear by reference to Figs. 1 and 2. The portions of the under side of saddle S above the bearing surface 14a of rails 14, are formed to provide the bearing surfaces 16 complementary to and in sliding bearing engagement with the surfaces 14a, respectively, throughout the lengths of these surfaces. Retaining or guide bars 16a may be provided along the under sides of the outer, opposite end portions, respectively, of saddle S which project outwardly beyond rails 14, with these bars being extended inwardly beneath the under sides of the rails.

There is thus provided an extremely rigid and stable slidable mounting for the saddle S on the upper side of knee K for translation of the saddle transversely relative to the machine on and constrained to a straight line path by the central slide way 12 and the widely laterally outwardly spaced supporting and bearing surfaces 14—16 at opposite ends of the saddle. The saddle may, as in this instance, be power driven by a suitable feed (not shown) mounted and enclosed within knee K, with a hand crank SP being provided at the right hand side of the machine for controlling such feed. An optional manual operation of the transverse or saddle cross feed is provided having a hand wheel SH mounted at the forward side of the knee for manual operation of such feed.

The saddle S provides a supporting base member having an upper surface of generally rectangular plane form, as indicated generally by the reference character 17 on which there is mounted the swivel block B. This upper surface 17 is precisely machined and finished to provide a bearing surface which extends throughout the length and wide and substantially over the area of the upper side of the saddle. As, in this example, the central slide way 12 of knee K is projected a distance forwardly from the front side of the knee, the saddle S is also provided with a forwardly projected portion 17a on which the bearing surface 17 is continued in forward extension at the under side of the projected portion for engagement with the forwardly projected portions of the bearing surface 12b of slide way 12. The supporting and bearing surface 17 thus provided at upper side of saddle S, is comprised of the central area surface 17C and the opposite right and left hand areas 17R and 17L.

The swivel block B is, in accordance with my invention, formed by a rectangular, plate-like member of the same general plan form and dimensions as the upper side of the saddle S. Referring now to Fig. 9, swivel block B provides an under surface generally identified by the reference character 18, which extends substantially throughout the length and width of the block and which is substantially unbroken throughout its area, except for the circular T-groove 20 and the centrally located bore 21 through the block concentric with that groove. This under side of swivel block B is suitably precision machined and finished and is comprised of the central area bearing surface 18C within the circular T-groove 20, and the opposite end supporting and bearing surface areas 18R and 18L which extend throughout the opposite side portion of the swivel block between the ends of the block and the adjacent sides of the groove 20, respectively, and from front to rear of the block between the forward and rear side edge portions of the block.

At the forward side of the under surface of block B, a circular wall portion 23 is formed concentric with the circular T-groove 20, and this circular wall provides a forward vertical, curved surface concentric with bore 21, on which there is formed scale markings 24, calibrated and spaced in degrees about the axis of T-groove 20. The under side of a curved portion 23 of swivel block B is also suitably machined and finished to provide the curved supporting and bearing surface 18F surrounding and concentric with the adjacent wall of the circular T-groove 20, to thus provide a bearing surface for the block across the forward side thereof in uninterrupted continuation of and joining the opposite end bearing surfaces 18R and 18L.

Referring to Fig. 3 in connection with Figs. 1, 6 and 9, the swivel block B is formed with a forwardly projected central portion 19 substantially of the width and opposite end wall curvature of the projected portion 17a of saddle S. Hence, the scale carrying circular dial forming wall portion 23 is slightly inset relative to projected portion 19 but with scale 24 on portion 23 being positioned at the forward side of the assembly with the swivel block in mounted position, for ready visual reading by the operator.

The swivel block B, so formed, is mounted in horizontal position supported on the upper side of the base member or saddle S with the bearing surfaces 18C and 18R and 18L at the under side thereof in slidable, bearing engagement on the substantially coextensive complementary bearing surface areas 17C and 17R and 17L, respectively, provided by the upper side surface 17 of saddle S. The saddle block B is thus mounted in such position for angular adjustment on the saddle, supported substantially throughout its entire width, length and area from front to rear and between opposite ends on saddle S by such extended area, full width bearing surfaces. In the example hereof, the swivel block B is mounted on and constrained to rotation on the saddle S for infinite angular adjustments thereon through an included angle of approximately 90°, that is, angular adjustment from normal position perpendicular to the path of cross feed to either the right or to the left through an angular range of approximately 45°.

The swivel block B is located on the saddle S and pivots about the gear housing 21a located in bore 21, as an axis for angular adjustment of the block on the saddle, as will be clear from Figs. 2, 4, 5 and 8. Such rotatable mounting of swivel block B includes the arcuate T-nuts 30 mounted on the upper side of saddle S in positions at diametrically opposite sides of the vertical axis of rotation of the swivel block on the saddle. These arcuate T-nuts 30 have a radius of curvature corresponding to the radius of curvature of the circular T-groove 20 formed in the under side of swivel block B, that is, they form segments or arcs of the circle on which T-slot 20 is generated. In this example T-nuts 30 are positioned at opposite, lateral sides of the axis of rotation of swivel block B in positions extending transversely across saddle S between the central portion thereof and the opposite right and left hand ends, respectively, of the saddle. Referring to Fig. 9, the T-groove 20 at the under side of swivel block B is located thereon with its axis offset rearwardly from the transverse center of the block so that the rear or back edge wall of the block lies on a chord cutting across the T-groove with the groove opening through the rear edge wall of the block to form laterally spaced end openings 20L and 20R through which the T-nuts 30 may be inserted and removed to and from position slidably constrained in the slot.

Each of the T-nuts 30 provides a clamp by which the swivel block may be releasably clamped and locked in any position of adjustment on the saddle. In this instance, each T-nut 30 is mounted on the cylindrical clamp blocks 31 secured to the under side of the nut adjacent opposite ends thereof, respectively, by the externally threaded stems 31a extending axially from one end of each block. Spaced vertical bores 31b are formed in saddle S opening through the upper surface thereof, a pair of such bores being provided for receiving each pair of clamp blocks 31, respectively, of a T-nut 30. Each T-nut 30 is mounted in position on saddle S by mounting the blocks 31 thereon in the pair of spaced bores 31b provided in saddle S at that side thereof at which such T-nut is positioned. The external diameter 31b of each block 31 relative to the internal diameter of its receiving bore 31b is such that each block forms a relatively loose fit in it bore. Each clamping block 31 has a length less than the depth of its receiving bore so that with the swivel block B in position on saddle S, the lower end of the block will be spaced from the inner end of the bore 31b in which it is mounted to provide clearance for downward displacement of the block.

Referring to Figs. 2 and 7, each clamping block 31 is provided with a bore 31c extending transversely therethrough intermediate its length, with the bore being formed to provide therewithin a conical, annular clamping surface 31d therearound. The clamping blocks 31 of a T-nut 30 are mounted in position in their respective bores 31b with the transverse bores 31c disposed longitudinally of the saddle S and with the wider diameter end of the conical surface 31d of each block bore 31c facing outwardly toward the adjacent end of the saddle. The saddle S is formed at each end thereof with a pair of spaced, horizontal bores 31e opening through the end wall and extending horizontally through the saddle to and opening at their inner ends into the outer ends of the bores 31c, respectively, of the pair of clamping blocks 31 adjacent that end of the saddle. The outer end length of each saddle bore 31e is internally screw threaded. A clamping bolt 32 having its outer length externally threaded, is provided in each bore 31e, with the external threading thereof threaded through the bore threading. Each bolt 32 provides a smooth surfaced shank extending inwardly through the bore to and through the bore 31d of its clamping block 31. The inwardly extended shank of each clamping bolt 32 is formed to provide an annular, tapered or conical camming surface 32a which is engaged in camming contact with the lower portion of the conical clamping surface 31d of the associated clamping block 31. The offset necessary between each bore 31e of the saddle and the bore 31c of that clamping block 31 associated therewith, to effect camming downwardly of the block by surface 32a of a clamping bolt 32, is obtained by threading a clamp block 31 the required distance into its T-nut. Hence, the necessity of accurately locating the bore 31e is eliminated.

Thus, by threading the clamping bolts 32 inwardly, the clamp blocks 31, respectively, are cammed downwardly to thereby tightly draw the T-nuts 30 downwardly into positions rigidly clamping the swivel block B to the saddle S against rotation or displacement of the block from an adjusted position. By threading the clamping bolts 32 outwardly the clamp blocks 31 are released for slight upwardly displacement to thereby release swivel block B for manual rotation on saddle S under constraint of the T-nuts 30, to a desired adjusted position. The swivel block may then be secured in such adjusted position by tightening up on the clamping bolts 32.

The swivel block B at the upper side thereof is formed and constructed, preferably by means of structure integral with the body of the block, to provide a dove-tailed type of slide way providing the opposite parallel, horizontal bearing surfaces 40 extending longitudinally of and across block B along and adjacent the forward and rear sides thereof, respectively. This slide way forming structure includes transverse end wall structures 41 and 42 and spaced intermediate transverse wall structures 43. A work table W is slidably mounted and confined on the slide bearing surfaces 40 of swivel block B, the table being provided with diverging guide flanges 44 (see Fig. 8) for engaging under slide ways 40 in the manner generally familiar in the art for mounting this type of work table. Work table W extends across and beyond opposite ends of swivel block B generally longitudinally of the machine, and is movable on and across the slide block in either direction along a straight line path perpendicular to the straight line path of cross feed of the saddle S on knee K for longitudinal feeding.

The work table W is fed in either direction along its path of feed longitudinally of the machine on and independently of swivel block B by a usual lead screw 50, as will be clear by reference to Figs. 1 and 6. The feed screw 50 is engaged in the usual manner with a feed screw nut (not shown) fixed on swivel block B. The feed screw 50 may be manually rotated for manual feed of the table by the usual hand wheel WH located at one end of the work table, as shown in Fig. 1.

In this example, the illustrated milling machine is of the power drive type and a power feed is provided for feeding the work table W. Referring to Figs. 3, 5, and 8, such feed may include a vertically disposed shaft 51 journaled in the saddle S and suitably driven from the motor M. A vertical shaft 52 is journaled in the saddle with its axis aligned with the axis of rotation of the swivel block B on the saddle. Shaft 52 extends upwardly through the bore 21 of swivel block B and thus forms and defines the center about which the block is rotatable for angular adjustment. A gear 53 on the upper end of shaft 51 drives a gear 54 journaled in the upper side of saddle S. Gear 54 is in driving mesh with a gear 55 on the lower end of shaft 52. The swivel block S mounts in the intermediate wall structures 43 the set of spaced, axially aligned and opposed bevel gears 56. A bevel gear 57 is mounted on the upper end of shaft 52, and is in mesh at diametrically opposite sides thereof with the bevel gears 56. The bevel gears 56 are in turn engaged with a set of gears 58, respectively, also journaled in the transverse wall structures 43, for reversible driving engagement with the lead screw 50. In this manner the swivel block B is rotatable on saddle S about shaft 52 as an axis with the set of bevel gears 56 maintained in constant driving mesh with bevel gear 57 in all positions of adjustment of the swivel block.

By the foregoing arrangement and assembly, the saddle S with swivel block B and work table W are movable together as a unit on knee K for cross feeding of the table W "in" and "out" transversely relative to the machine. The work table W is movable in either direction along its straight line path of feed on and independently of swivel block B for feeding longitudinally relative to the machine. And, the swivel block B may be rotated on and independently of saddle S to any desired position of angular adjustment within the adjustment range to thereby angularly adjust the work table W and its path of longitudinal feed, relative to the path of cross feed of the saddle, swivel block and table assembly.

When the machine is to be used as a plain milling machine, with the swivel block B in what may be termed its normal position of adjustment to position swivel block B and the work table W for longitudinal feed of the table along a path perpendicular to the path of cross feed, it is desirable to insure a maximum of rigidity for the table against deflection on the supporting assembly of knee, saddle and swivel block. By my invention I have provided for additional clamping and securing together of the saddle and swivel block, such additional clamping being made possible by the extended, full dimensioned supporting and bearing surfaces by which the swivel block is mounted on the saddle S. Such additional clamping and securing means is supplied in this example by a pair of spaced clamping bolts 60R at the right hand side, and by a pair of spaced clamping bolts 60L at the left hand side, of the assembly of saddle S and swivel block B.

Referring now to Fig. 4, there is provided at the right hand end of saddle S a pair of spaced vertical bores 61, while there is provided at the left hand of the saddle a similar pair of vertical, spaced bores 62. The swivel block B, referring to Fig. 9, is provided at the right hand side thereof with a pair of spaced vertical bores 61a, while there is provided at the left hand end of block B a similar pair of vertical, spaced bores 62a. The saddle bores 61—62 extend through the saddle and the swivel block bores 61a—62a extend completely through the block with these latter bores located on the block for axial alignment with the saddle bores 61—62, respectively, when the swivel block and work table W are adjusted into normal position for the work table W. Each of the bores 61a and 62a of swivel block B is internally screw threaded. In this example, the bolts 60R and 60L are of identical construction, and each is provided with external screw threading 63 (Figs. 4 and 5) at one end portion thereof and with a head 64 at the opposite end of the bolt.

When swivel block B is adjusted into position to lock worktable W in its normal position with its path of longitudinal feed perpendicular to the path of cross feed of saddle S, the bores 61a at the right hand end of the swivel block are aligned with the bores 61, respectively, through saddle S, while the bores 62a at the left hand end of the block are aligned with the bores 62 in the left hand end of the saddle. The locking bolts 60R may then be extended upwardly through the aligned bores 61—61a, respectively, into threaded engagement with the bores 61a of the block and tightened to clamp the right hand end portions of the swivel block and saddle assembly rigidly together. The clamping bolts 60L may be similarly inserted upwardly through and threaded into the aligned bores 62—62a; respectively, at the left hand end of the block and saddle assembly to tightly, rigidly clamp and secure the left hand end portions of the swivel block and saddle assembly.

Thus, with the clamping bolts 32 tightened to clamp and rigidly fix the central portion of the swivel block B to the central portion of the saddle S, there is provided an extremely rigid and stable clamping of the swivel block to the saddle to, in effect, form a unit structure with the possibility of displacement of the swivel block B in any direction relative to the saddle S substantially eliminated.

When it is desired to adjust the worktable W from its normal position, angularly in either direction relative to the path of cross feed on knee K, and to the machine, the clamping bolts 60R and 60L are unthreaded and removed downwardly from the sets of aligned bores 61—61a and 62—62a, respectively. The clamping screws 32 are then rotated to positions releasing the clamping blocks 31 of the T-nuts 30, after which the swivel block B with worktable W may be rotated manually to the desired degree of angular adjustment as determined from the scale 24 at the front of the swivel block. The clamping screws 32 are then tightened to draw the T-nuts 30 downwardly to tightly and rigidly clamp the swivel block B and table W in such adjusted position. Due to the extended area bearing surfaces provided by the saddle S and swivel block B, even when in positions of maximum angular adjustment, the swivel block, and hence the worktable, have maximum supporting and bearing areas to insure maximum rigidity and stability for the worktable. In this manner, maximum accuracy and precision of the machining operations performed on a work piece supported on the worktable W with this table in angularly adjusted positions, is insured.

It is also evident that various changes, modifications, variations, additions, eliminations and substitutions may be resorted to without departing from the broad spirit and scope of my invention, and hence I do not desire or intend to limit my invention in all respects to the exact and specific disclosures hereof.

What I claim is:

In combination, a supporting base member formed to provide on the outer side thereof a substantially planar bearing surface; a pivot on the bearing surface side of said supporting base member located approximately on the transverse center thereof; a swivel block rotatably mounted on said pivot and having at the inner side thereof a substantially planar bearing surface for bearing engagement with said supporting base member bearing surface; arcuate T-nuts mounted on the outer side of said supporting base member in positions thereon extending outwardly from said bearing surface of the supporting base member; said arcuate T-nuts being mounted on said supporting base member in locations spaced equal distances thereon from opposite sides of said pivot in locations adjacent the opposite ends of the said supporting base member; said swivel block being formed with a circular T-groove therein opening through the inner side thereof and being generated about the pivot axis of said swivel block as a center; said arcuate T-nuts being adapted to be freely slidably received and confined in said circular T-groove for movements therein transversely thereof between positions releasably clamping said swivel block to said supporting base member; means mounted on said supporting base member in operative connection with said T-nuts for actuating said T-nuts to clamping positions; sets of bores in adjacent ends of said supporting base member and said swivel block adapted to be placed in axial alignment when said swivel block is in a predetermined position of angular adjustment on said supporting base member; and clamping members adapted to be received in said sets of bores to clamp said swivel block to said supporting base member when the swivel block is in said predetermined position.

References Cited in the file of this patent

UNITED STATES PATENTS

| Number | Name | Date |
|---|---|---|
| 513,683 | Holz | Jan. 30, 1894 |
| 554,422 | Holz | Feb. 11, 1896 |
| 612,466 | Tyler | Oct. 18, 1898 |
| 1,116,342 | Adams | Nov. 3, 1914 |
| 1,155,987 | Beckett | Oct. 5, 1915 |
| 1,397,771 | Mort | Nov. 22, 1921 |
| 1,735,478 | Stubbs | Nov. 12, 1929 |
| 1,931,730 | Klay | Oct. 24, 1933 |
| 2,181,128 | Hack | Nov. 28, 1939 |
| 2,182,019 | Eisele | Dec. 5, 1939 |
| 2,252,627 | Gorton | Aug. 12, 1941 |
| 2,289,874 | Curtis | July 14, 1942 |
| 2,379,405 | Armitage | July 3, 1945 |
| 2,383,829 | Thompson | Aug. 28, 1945 |